United States Patent
Hara et al.

(10) Patent No.: US 9,857,456 B2
(45) Date of Patent: Jan. 2, 2018

(54) ARRANGEMENT STRUCTURE FOR PERIPHERAL INFORMATION DETECTION SENSOR AND SELF-DRIVING VEHICLE

(71) Applicant: TOYOTA JIDOSHA KABUSHIKI KAISHA, Toyota-shi, Aichi-ken (JP)

(72) Inventors: Yasuhiro Hara, Odawara (JP); Takahito Endo, Sunto-gun (JP); Seiji Yamamoto, Seto (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/992,512

(22) Filed: Jan. 11, 2016

(65) Prior Publication Data
US 2016/0306030 A1    Oct. 20, 2016

(30) Foreign Application Priority Data
Apr. 16, 2015    (JP) ................................. 2015-084310

(51) Int. Cl.
*G01C 22/00*    (2006.01)
*G01S 7/481*    (2006.01)
(Continued)

(52) U.S. Cl.
CPC .......... *G01S 7/4813* (2013.01); *G01S 17/936* (2013.01); *G01S 2007/027* (2013.01);
(Continued)

(58) Field of Classification Search
CPC .............................. G01S 7/4813; G01S 17/936
USPC ..... 701/301, 41, 45, 65, 23, 70, 78, 96, 110, 701/117; 340/436, 903, 467, 435, 340/426.32; 342/66, 74, 82, 89, 176, 342/202, 357.22, 357.21, 454, 455, 456, 342/463; 180/207.3, 244, 325, 282; 280/28.11, 777; 455/88, 73, 91,
(Continued)

(56) References Cited

U.S. PATENT DOCUMENTS 6,806,452 B2 * 10/2004 Bos ........................ B60N 2/002
250/208.1
9,523,984 B1 * 12/2016 Herbach .............. B62D 15/025
(Continued)

FOREIGN PATENT DOCUMENTS

JP    H01-154486 U    10/1989
JP    11-078717    *  9/1997
(Continued)

OTHER PUBLICATIONS

Jun. 20, 2017 Office Action issued in Japanese Patent Application No. 2015-084310.

*Primary Examiner* — Muhammad Shafi
(74) *Attorney, Agent, or Firm* — Oliff PLC

(57) ABSTRACT

An arrangement structure for a peripheral information detection sensor includes the peripheral information detection sensor, a detection portion of which detects peripheral information of a vehicle, and an interior trim member. The peripheral information detection sensor is disposed at a vehicle cabin interior side of a windshield glass whose exterior surface is wiped by a wiper. The detection portion is disposed at a position opposing a wiping range of the wiper on the windshield glass. The interior trim member covers the peripheral information detection sensor from the vehicle cabin interior side thereof.

7 Claims, 11 Drawing Sheets

(51) Int. Cl.
  *G01S 17/93* (2006.01)
  *G01S 13/93* (2006.01)
  *G01S 15/93* (2006.01)
  *G01S 7/02* (2006.01)

(52) U.S. Cl.
  CPC .............. *G01S 2013/9375* (2013.01); *G01S 2013/9378* (2013.01); *G01S 2013/9392* (2013.01); *G01S 2015/937* (2013.01)

(58) Field of Classification Search
  USPC ............ 455/90.1–90.3, 132, 89, 572, 404.1, 455/404.2, 456.1–456.6; 707/621, 653
  See application file for complete search history.

(56) References Cited

U.S. PATENT DOCUMENTS

| | | |
|---|---|---|
| 2003/0090569 A1 | 5/2003 | Paechmueller |
| 2004/0039509 A1* | 2/2004 | Breed .................... B60C 11/24 701/45 |
| 2004/0215382 A1* | 10/2004 | Breed .................... B60C 11/24 701/45 |
| 2010/0182425 A1 | 7/2010 | Sakakida et al. |
| 2014/0375446 A1* | 12/2014 | Wanami .............. G07C 5/0891 340/436 |

FOREIGN PATENT DOCUMENTS

| | | |
|---|---|---|
| JP | H11-63975 A | 3/1999 |
| JP | H11-78717 A | 3/1999 |
| JP | H11-326541 A | 11/1999 |
| JP | 3148749 B1 | 3/2001 |
| JP | 2003-525165 A | 8/2003 |
| JP | 2005-047354 A | 2/2005 |
| JP | 2005-112051 A | 4/2005 |
| JP | 2010-203836 A | 9/2010 |
| JP | 2014-151778 A | 8/2014 |

* cited by examiner

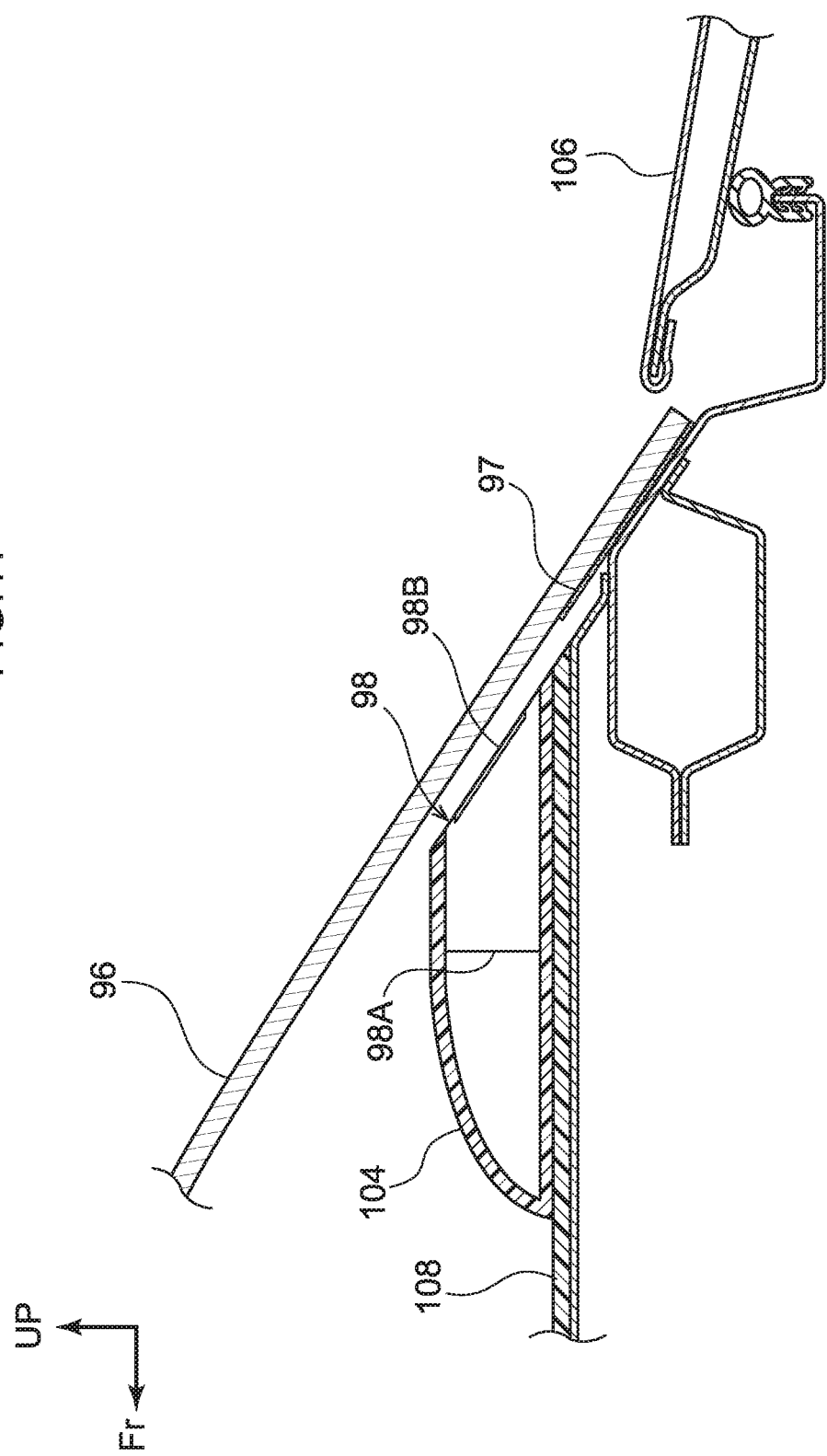

ARRANGEMENT STRUCTURE FOR PERIPHERAL INFORMATION DETECTION SENSOR AND SELF-DRIVING VEHICLE

CROSS-REFERENCE TO RELATED APPLICATION

This application claims priority under 35 USC 119 from Japanese Patent Application, No. 2015-084310 filed Apr. 16, 2015, the disclosure of which is incorporated by reference herein.

BACKGROUND OF THE INVENTION

Technical Field

The present invention relates to an arrangement structure for a peripheral information detection sensor and to an self-driving vehicle.

Related Art

Japanese Patent Application Laid-Open (JP-A) No. H11-078717 discloses a technology in which a camera (a peripheral information detection sensor) is disposed at the vehicle cabin interior side of a front windshield glass and a running environment in front of the vehicle is imaged by the camera. JP-A No. H11-078717 recites a structure that, during rainy weather, assures a field of view of the camera in accordance with operations of windshield wipers.

SUMMARY

However, this peripheral information detection sensor can be seen by vehicle occupants. Thus, the appearance of the vehicle cabin interior side is degraded. Therefore, there is scope for improvement in regard to improving the appearance of a vehicle cabin interior.

In consideration of the circumstances described above, an object of the present invention is to provide an arrangement structure for a peripheral information detection sensor that may improve the appearance of a vehicle cabin interior while assuring detection accuracy of the peripheral information detection sensor during rainy weather, and to provide an self-driving vehicle.

Solution to Problem

An arrangement structure for a peripheral information detection sensor according to a first aspect includes: the peripheral information detection sensor, a detection portion of which detects peripheral information of a vehicle, the peripheral information detection sensor being disposed at a vehicle cabin interior side of a windshield glass whose surface is wiped by a wiper, and the detection portion being disposed at a position opposing a wiping range of the wiper on the windshield glass; and an interior trim member that covers the peripheral information detection sensor from the vehicle cabin interior side.

In the arrangement structure for a peripheral information detection sensor of the first aspect, the windshield glass is structured such that the surface thereof is wiped by the wiper. The peripheral information detection sensor is disposed at the vehicle cabin interior side relative to the windshield glass. The peripheral information detection sensor is equipped with the detection portion that detects peripheral information of the vehicle. This detection portion is provided at the position that opposes the windshield glass in the range of wiping by the wiper. Therefore, even if rainwater adheres to the exterior surface of the windshield glass during rainy weather, dirt adheres to the exterior surface of the windshield glass, or the like, the rainwater, dirt or the like may be removed by the exterior surface of the windshield glass being wiped by the wiper and detection accuracy of the peripheral information detection sensor may be assured.

The peripheral information detection sensor is covered from the vehicle cabin interior side thereof by the interior trim member. Therefore, the peripheral information detection sensor is not exposed to the vehicle cabin interior side. Thus, viewing of the peripheral information detection sensor by vehicle occupants may be avoided. Consequently, the appearance of the vehicle cabin interior side may be improved compared to a structure in which a peripheral information detection sensor is disposed at a location at which the peripheral information detection sensor can be seen. In particular, because the peripheral information detection sensor is covered by the interior trim member, the peripheral information detection sensor may be provided without imparting a feeling of strangeness to vehicle occupants.

In an arrangement structure for a peripheral information detection sensor according to a second aspect, in the first aspect, the peripheral information detection sensor is assembled to the interior trim member and made integral with the interior trim member.

In the arrangement structure for a peripheral information detection sensor of the second aspect, the interior trim member may be assembled to a vehicle main body in a state in which the peripheral information detection sensor has been assembled to and made integral with the interior trim member. Therefore, a workload may be reduced compared to a case in which a peripheral information detection sensor and an interior trim member are assembled to a vehicle main body separately.

In an arrangement structure for a peripheral information detection sensor according to a third aspect, in the first aspect or the second aspect, a detection surface of the detection portion abuts against a surface at the vehicle cabin interior side of the windshield glass.

In the arrangement structure for a peripheral information detection sensor of the third aspect, cases of foreign matter such as dust or the like interposing in a space between the detection surface and the windshield glass and reducing detection accuracy may be avoided.

In an arrangement structure for a peripheral information detection sensor according to a fourth aspect, in any one of the first aspect to the third aspect, the interior trim member is formed by a member with electrical conductivity.

In the arrangement structure for a peripheral information detection sensor according to the fourth aspect, because the interior trim member features electrical conductivity, electromagnetic waves generated at the vehicle cabin interior side that are directed toward the peripheral information detection sensor may be blocked by the interior trim member. Therefore, effects of electromagnetic noise on the peripheral information detection sensor may be suppressed.

An self-driving vehicle according to a fifth aspect includes: the arrangement structure for a peripheral information detection sensor of any one of the first aspect to the fourth aspect; and a control unit that controls running of the vehicle in accordance with peripheral information detected by the peripheral information detection sensor.

In the self-driving vehicle of the fifth aspect, because the peripheral information detection sensor is covered from the vehicle cabin interior side by the interior trim member, the appearance of the vehicle cabin interior may be improved.

Furthermore, because the control unit controls running of the vehicle in accordance with peripheral information of the vehicle, a burden on a driver during driving may be reduced.

Advantageous Effects of Invention

As described above, according to the arrangement structure for a peripheral information detection sensor according to the first aspect, excellent effects are provided in that the detection accuracy of the peripheral information detection sensor during rainy weather may be assured while the appearance of the vehicle cabin interior may be improved.

According to the arrangement structure for a peripheral information detection sensor according to the second aspect, an excellent effect is provided in that the efficiency of assembly operations may be improved.

According to the arrangement structure for a peripheral information detection sensor according to the third aspect, an excellent effect is provided in that the detection accuracy of the peripheral information detection sensor may be excellently maintained.

According to the arrangement structure for a peripheral information detection sensor according to the fourth aspect, an excellent effect is provided in that a reduction in detection accuracy of the peripheral information detection sensor due to electromagnetic noise may be suppressed.

According to the self-driving vehicle according to the fifth aspect, excellent effects are provided in that the appearance of the vehicle interior may be assured while the vehicle may be autonomously driven by the control unit.

BRIEF DESCRIPTION OF THE DRAWINGS

Embodiments of the present invention will be described in detail based on the following figures, wherein:

FIG. 11 is a sectional diagram showing a section cut along line 11-11 of FIG. 10 in a magnified state.

DETAILED DESCRIPTION OF THE INVENTION

First Exemplary Embodiment

Figure 1:
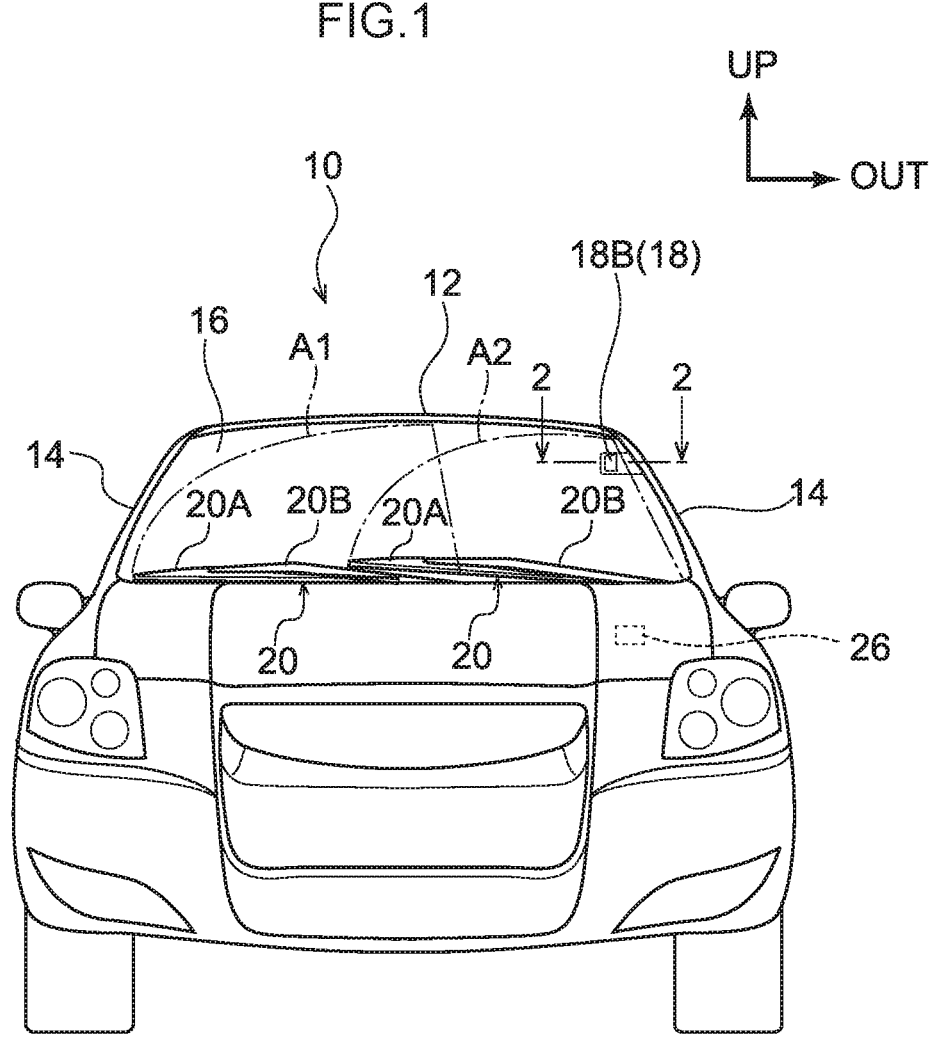
FIG. 1 is a front view, seen from a vehicle front side, of a vehicle in which an arrangement structure for a peripheral information detection sensor in accordance with a first exemplary embodiment is employed.

Herebelow, an self-driving vehicle in which an arrangement structure for a peripheral information detection sensor in accordance with a first exemplary embodiment of the present invention is employed is described with reference to FIG. 1 and FIG. 2. The arrow FR that is shown as appropriate in the drawings indicates the vehicle front side of the self-driving vehicle in which the peripheral information detection sensor is mounted, the arrow UP indicates the vehicle upper side, and the arrow OUT indicates a vehicle width direction outer side. In the following descriptions, where the directions front, rear, up, down, left and right are used without being particularly specified, the same represent the front and rear in the vehicle front-and-rear direction, up and down in the vehicle up-and-down direction, and left and right if facing in the running direction.

Figure 2:
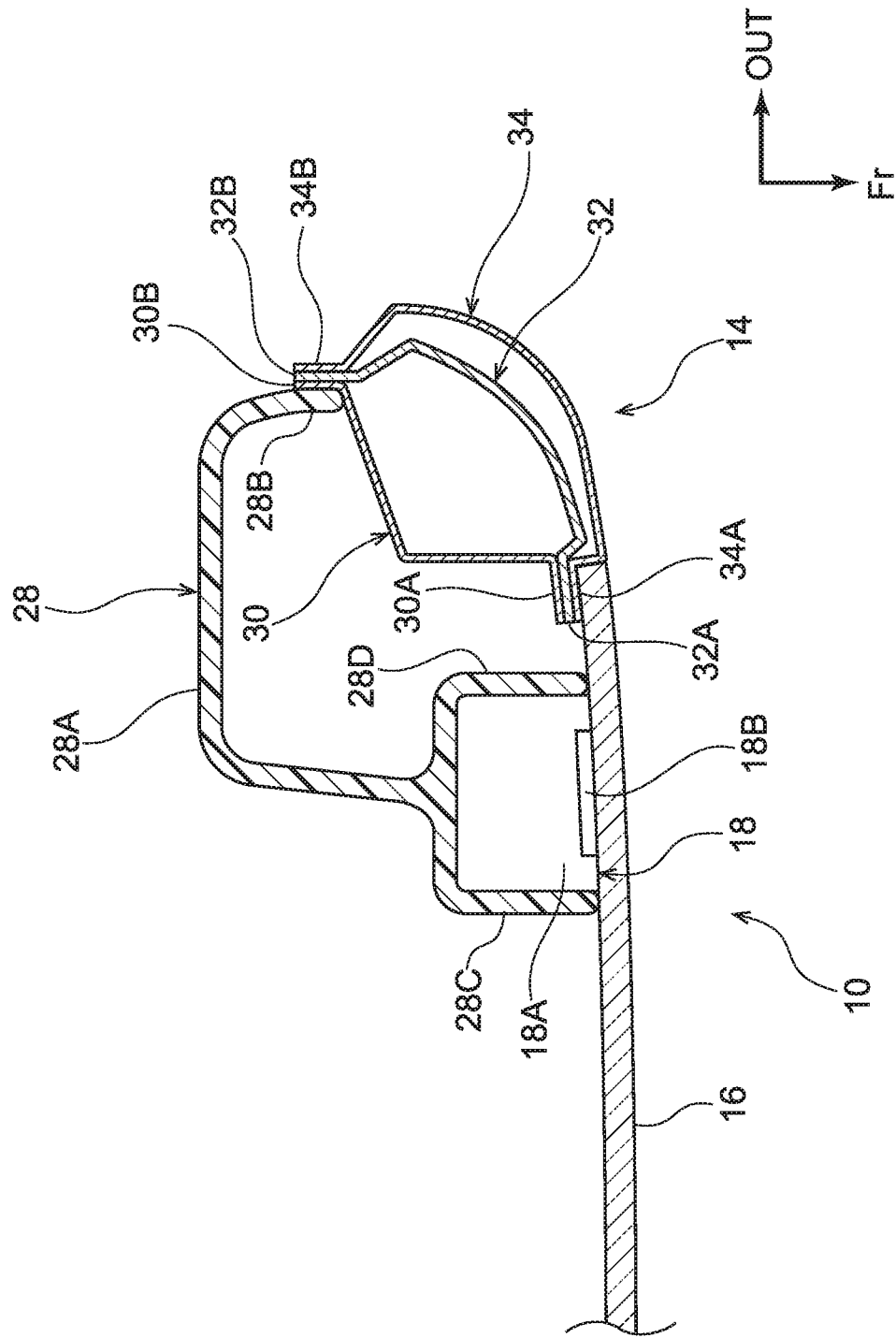
FIG. 2 is a sectional diagram showing a section cut along line 2-2 of FIG. 1 in a magnified state.

As shown in FIG. 1, a roof panel 12 is disposed at a vehicle upper portion of an self-driving vehicle 10 (hereinafter referred to simply as "the vehicle 10"). A pair of left and right roof side rails, which are not shown in the drawings, are disposed at the two vehicle width direction sides of the roof panel 12.

A pair of left and right front pillars 14 extend toward the vehicle lower side from front end portions of the roof side rails. A front windshield glass (a front glass) 16 is disposed between the pair of left and right front pillars 14. The front windshield glass 16 divides a vehicle cabin interior side from a vehicle cabin exterior side. A peripheral information detection sensor 18 is disposed at the vehicle cabin interior side of the front windshield glass 16. Details of the peripheral information detection sensor 18 are described below.

Front wipers 20 are provided at a lower end portion of the front windshield glass 16. Each front wiper 20 includes a wiper blade 20A and a wiper arm 20B. The wiper blade 20A touches against the exterior surface of the front windshield glass 16 and wipes off rainwater and the like. The wiper arm 20B retains the wiper blade 20A.

The wiper blades 20A and wiper arms 20B are controlled to reciprocate by a motor and a link mechanism, which are not shown in the drawings. The wiper blades 20A and wiper arms 20B are structured so as to wipe a wiping range A1 and a wiping range A2 of the front windshield glass 16. The front wipers 20 according to the present exemplary embodiment employ a tandem system that wipes with two wipers. However, the present invention is not limited thus and alternative wiping patterns may be employed.

Now, an arrangement structure for the peripheral information detection sensor 18 that is disposed at the vehicle cabin interior side relative to the front windshield glass 16 is described. As shown in FIG. 2, the peripheral information detection sensor 18 according to the present exemplary embodiment is disposed at the vehicle cabin interior side of an end portion at the vehicle left side of the front windshield glass 16. The peripheral information detection sensor 18 is assembled to and made integral with a front pillar garnish 28, which serves as an interior trim member.

Each front pillar 14 is formed as a closed cross section structure that includes a front pillar inner panel 30, a front pillar outer panel 32 and a side outer panel (a side member outer) 34.

The front pillar inner panel 30 is disposed at the vehicle inner side. A plan view cross-sectional shape of the front pillar inner panel 30 seen from the vehicle upper side is formed substantially in a hat shape that is open to the vehicle front side and the vehicle width direction outer side. An inner side inner flange 30A protrudes to the vehicle width direction inner side from a vehicle width direction inner side end portion of the front pillar inner panel 30. An inner side outer flange 30B protrudes to the vehicle rear side from a vehicle width direction outer side end portion of the front pillar inner panel 30.

The front pillar outer panel 32 is disposed at the vehicle exterior side relative to the front pillar inner panel 30. A plan view cross-sectional shape of the front pillar outer panel 32 seen from the vehicle upper side is formed substantially in a hat shape that is open to the vehicle rear side and the vehicle width direction inner side. An outer side inner flange 32A protrudes along the inner side inner flange 30A from a vehicle width direction inner side end portion of the front pillar outer panel 32. An outer side outer flange 32B protrudes along the inner side outer flange 30B from a vehicle width direction outer side end portion of the front pillar outer panel 32.

The side outer panel 34 is disposed at the vehicle width direction outer side relative to the front pillar outer panel 32. A plan view cross-sectional shape of the side outer panel 34 seen from the vehicle upper side is formed substantially in a hat shape that is open to the vehicle rear side and the vehicle width direction inner side. An inner flange portion 34A protrudes along the outer side inner flange 32A from a vehicle width direction inner side end portion of the side outer panel 34. The inner flange portion 34A is joined to the inner side inner flange 30A and the outer side inner flange 32A by welding or the like. An end portion of the front windshield glass 16 is joined to a surface at the vehicle outer side of the inner flange portion 34A.

An outer flange portion 34B protrudes along the outer side outer flange 32B from a vehicle width direction outer side end portion of the side outer panel 34. The outer flange portion 34B is joined to the inner side outer flange 30B and the outer side outer flange 32B by welding or the like.

The front pillar garnish 28 is disposed at the vehicle cabin interior side of one of the front pillars 14 that are structured as described above. A plan view cross-sectional shape of the front pillar garnish 28 viewed from the vehicle upper side is formed substantially in a "U" shape of which the vehicle front side is open. The front pillar garnish 28 is formed of a resin material with electrical conductivity. The front pillar garnish 28 is provided with a proximal portion 28A that is disposed in the vehicle width direction. Mounting seats, which are not shown in the drawings, project toward the front pillar inner panel 30 from the proximal portion 28A. The mounting seats are fixed to the front pillar inner panel 30 by clips or the like.

An outer end portion 28B is formed at the vehicle width direction outer side of the proximal portion 28A. The outer end portion 28B is inflected toward the vehicle front side from the proximal portion 28A. The outer end portion 28B abuts against the inner side outer flange 30B of the front pillar inner panel 30. An inner end portion is formed at the vehicle width direction inner side of the proximal portion 28A. The inner end portion is inflected toward the vehicle front side from the proximal portion 28A. Partway along, the inner end portion branches into a first inner end portion 28C and a second inner end portion 28D, which extend to the front windshield glass 16.

The first inner end portion 28C is disposed at the vehicle width direction inner side relative to the proximal portion 28A and extends in the vehicle front-and-rear direction. The second inner end portion 28D is disposed at the vehicle width direction outer side relative to the first inner end portion 28C and extends in the vehicle front-and-rear direction, substantially parallel with the first inner end portion 28C. The rear end side of the first inner end portion 28C and the rear end side of the second inner end portion 28D are connected in the vehicle width direction. Thus, a substantially rectangular space is formed between the first inner end portion 28C and the second inner end portion 28D. Viewed from the vehicle upper side, this space is open to the vehicle front side. The peripheral information detection sensor 18 is disposed in this space.

The peripheral information detection sensor 18 is equipped with a main body portion 18A that is formed substantially in a rectangular cuboid shape. Two side faces of the main body portion 18A are sandwiched by the first inner end portion 28C and the second inner end portion 28D. Bolt holes, which are not shown in the drawings, are formed in the first inner end portion 28C and the second inner end portion 28D. Bolts are screwed into these bolt holes and fasten the peripheral information detection sensor 18 and the front pillar garnish 28 together. Thus, the peripheral information detection sensor 18 is assembled to and made integral with the front pillar garnish 28. The peripheral information detection sensor 18 is covered from the vehicle cabin interior side by the front pillar garnish 28.

The method by which the peripheral information detection sensor 18 is assembled to the front pillar garnish 28 is not particularly limited. For example, a distance between the first inner end portion 28C and the second inner end portion 28D may be formed to be narrower than the width of the peripheral information detection sensor 18 in the state before the peripheral information detection sensor 18 is assembled. In this case, the peripheral information detection sensor 18 may be assembled while the first inner end portion 28C and second inner end portion 28D are being pushed apart. Hence, the peripheral information detection sensor 18 may be nipped by the first inner end portion 28C and second inner end portion 28D without bolts being screwed in.

The peripheral information detection sensor 18 is equipped with a detection portion 18B that detects peripheral information of the vehicle. In a plan view, the detection portion 18B is formed in a substantially rectangular shape that is long in the vehicle width direction. The detection portion 18B is oriented to the vehicle exterior side of the peripheral information detection sensor 18. In the present exemplary embodiment, a detection surface at the vehicle exterior side of the detection portion 18B is curved along a curved surface of the front windshield glass 16. This detection surface abuts against (makes surface contact with) a surface at the vehicle cabin interior side of the front windshield glass 16. The detection portion 18B is disposed at a position that opposes the wiping range A2 of the front wipers 20 (see FIG. 1).

In the present exemplary embodiment, as an example, a laser radar is employed as the peripheral information detection sensor 18 and a laser light emission unit and detection unit constitute the detection portion 18B, but this is not limiting. For example, a millimeter wave radar, an ultrasound sensor, an optical camera or the like may be employed, and alternative sensors may be employed. If a millimeter wave radar is employed as the peripheral information detection sensor 18, an electromagnetic wave transmission unit and reception unit constitute the detection portion 18B. If an ultrasound sensor is employed as the peripheral information detection sensor 18, an acoustic transmitter and an acoustic receiver constitute the detection portion 18B. If an optical camera is employed as the peripheral information detection sensor 18, a visible light detection unit constitutes the detection portion 18B.

As shown in FIG. 1, a controller 26 that serves as a control unit is provided in the vehicle 10. The controller 26 controls running of the vehicle 10 in accordance with peripheral information detected by the peripheral information detection sensor 18. The peripheral information detection sensor 18 is electronically connected to the controller 26. The controller 26 is also electronically connected to electric power steering (EPS), a brake electronic control unit (ECU) and so forth. The controller 26 is configured to be capable of controlling running of the vehicle 10 without a driver driving the vehicle 10. In the present exemplary embodiment, the controller 26 is configured to be switchable between an automatic driving mode, in which the controller 26 controls running of the vehicle 10 in accordance with peripheral information detected by the peripheral information detection sensor 18, and a manual driving mode, in which a driver personally operates a steering wheel, which is not shown in the drawings, and causes running of the vehicle 10. A location at which the controller 26 is installed is not limited by the present exemplary embodiment but may be suitably modified in accordance with the location of the peripheral information detection sensor 18. The above-mentioned driving modes are also not limiting. A configuration is possible that supports driving (high-level driving support) in accordance with peripheral information detected by the peripheral information detection sensor 18 and the like.

Operation and Effects

Now, operations and effects of the vehicle 10 in which the arrangement structure for the peripheral information detection sensor 18 according to the present exemplary embodiment is employed are described. In the present exemplary embodiment, the vehicle 10 is caused to run in accordance with peripheral information detected by the peripheral information detection sensor 18 that is assembled to the front pillar garnish 28 and suchlike. More specifically, peripheral information is detected by the detection portion 18B of the peripheral information detection sensor 18 and the peripheral information is sent to the controller 26 via a wire harness, which is not shown in the drawings. Hence, by signals being sent from the controller 26 to the EPS, the brake ECU and the like, running of the vehicle 10 is controlled in accordance with the peripheral information acquired from the peripheral information detection sensor 18 and the like. Thus, a burden on a driver during driving may be reduced.

In this exemplary embodiment, the detection portion 18B of the peripheral information detection sensor 18 is provided at a position that opposes the wiping range A2 of the front wipers 20 on the front windshield glass 16. Therefore, if rainwater adheres to the exterior surface of the front windshield glass 16 during rainy weather, detection accuracy of the peripheral information detection sensor 18 may be assured by the front wipers 20 wiping the exterior surface of the front windshield glass 16. Moreover, if dirt adheres to the exterior surface of the front windshield glass 16, the detection accuracy of the peripheral information detection sensor 18 may be assured by the front wipers 20 wiping off the dirt.

In the present exemplary embodiment, the peripheral information detection sensor 18 is covered from the vehicle cabin interior side thereof by the front pillar garnish 28. Therefore, the peripheral information detection sensor 18 is not exposed to the vehicle cabin interior side and the peripheral information detection sensor 18 cannot be seen by vehicle occupants. Consequently, the appearance of the vehicle cabin interior side may be improved compared to a structure in which the peripheral information detection sensor 18 is disposed at a position at which the peripheral information detection sensor 18 can be seen. In particular, because the peripheral information detection sensor 18 is covered by the front pillar garnish 28 in the present exemplary embodiment, compared to a structure in which the peripheral information detection sensor 18 is covered by a dedicated cover or the like, the peripheral information detection sensor 18 may be provided without imparting a feeling of strangeness to vehicle occupants. Moreover, compared to a structure in which a dedicated cover or the like is employed, a number of components may be reduced and costs may be lowered. That is, because a portion of the already existing pillar garnish is simply extended or the like to form a portion that covers the peripheral information detection sensor 18 from the vehicle cabin interior side thereof, the appearance of the vehicle cabin interior side may be improved while an increase in costs is restrained.

In the present exemplary embodiment, the peripheral information detection sensor 18 is assembled to and made integral with the front pillar garnish 28. Therefore, when the front pillar garnish 28 is being assembled to the vehicle main body, the front pillar garnish 28 may be assembled in a state in which the peripheral information detection sensor 18 has already been assembled to the front pillar garnish 28 (a sub-assembled state). Accordingly, the efficiency of assembly operations may be improved compared to a case in which the peripheral information detection sensor 18 is assembled separately.

In the present exemplary embodiment, because the detection surface of the detection portion 18B of the peripheral information detection sensor 18 abuts against the front windshield glass 16, cases of foreign matter such as dust or the like interposing in a space between the detection surface of the detection portion 18B and the front windshield glass 16 may be avoided. Thus, if a laser radar is employed as the peripheral information detection sensor 18 as in the present exemplary embodiment, laser light that is emitted from the detection portion 18B is illuminated to the vehicle cabin exterior side through the front windshield glass 16 without interfering with foreign matter within the vehicle cabin. As a result, the detection accuracy of the peripheral information detection sensor 18 may be excellently maintained.

In the present exemplary embodiment, because the front pillar garnish 28 is formed by a member with electrical conductivity, electromagnetic waves generated at the vehicle cabin interior side that are directed toward the peripheral information detection sensor 18 may be blocked. Therefore, effects of electromagnetic noise on the peripheral information detection sensor 18 may be suppressed. Thus, a reduction in the detection accuracy of the peripheral information detection sensor 18 may be suppressed.

In the present exemplary embodiment, the present invention is applied to the vehicle 10 in which the whole area of the front windshield glass 16 is transparent, but this is not a limitation of the present invention. For example, as in a variant example illustrated in FIG. 3 and FIG. 4, the arrangement structure for the peripheral information detection sensor 18 according to the present invention may be applied to a structure in which a ceramic treatment portion 42 is formed at an outer periphery portion of the front windshield glass 16.

Figure 3:
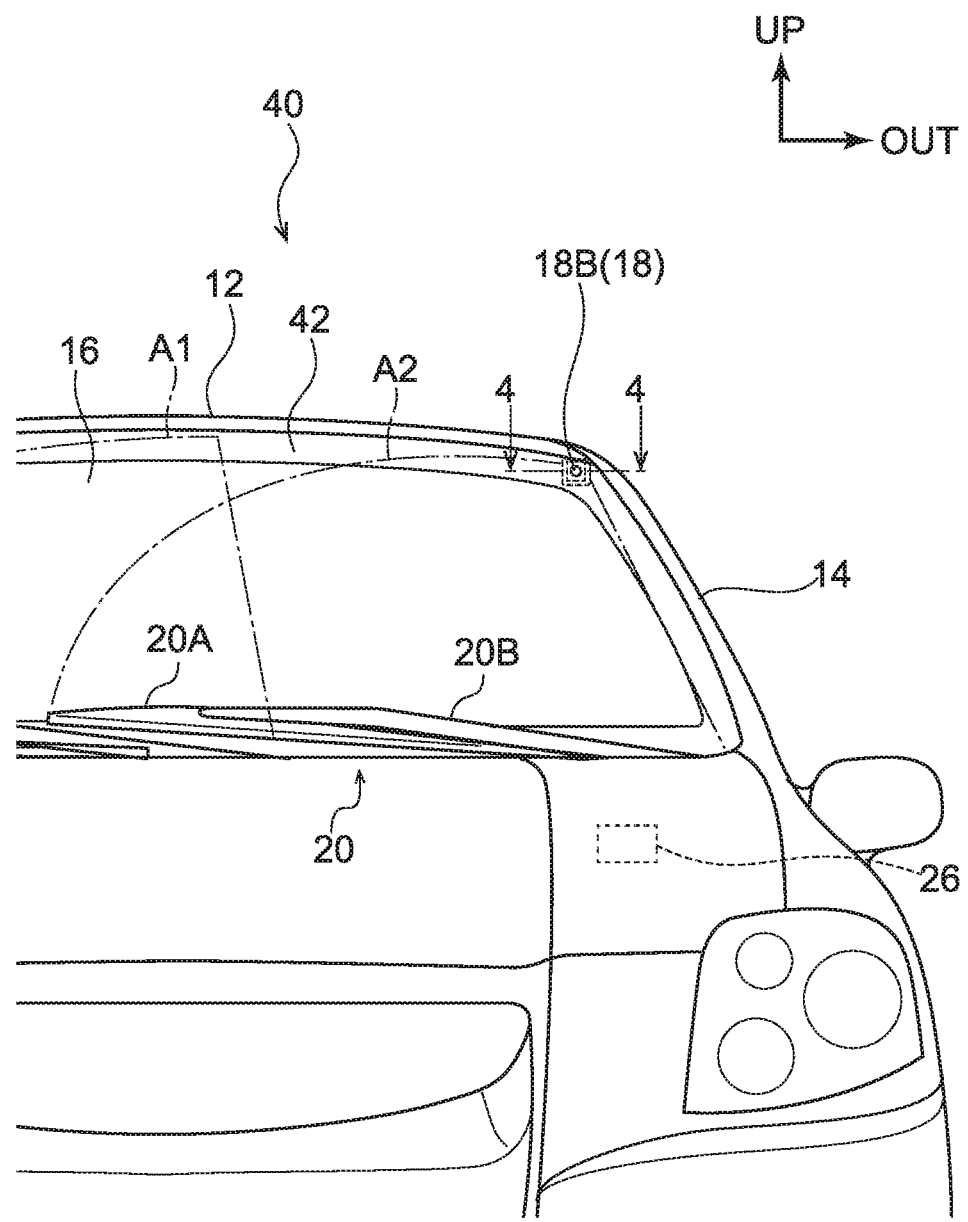
FIG. 3 is a front view, corresponding to FIG. 1, showing a variant example of the vehicle in which the arrangement structure for a peripheral information detection sensor in accordance with the first exemplary embodiment is employed, which is a view showing a magnification of the vehicle left side.

As shown in FIG. 3, the ceramic treatment portion 42 is formed in a strip shape at the outer periphery portion of the front windshield glass 16 of an self-driving vehicle 40 (hereinafter referred to simply as "the vehicle 40") according to the present variant example. In the present variant example, as viewed from the vehicle occupant side, the peripheral information detection sensor 18 is disposed at a corner portion at the left side of the upper end portion of the front windshield glass 16. Other structures are the same as in FIG. 1.

Figure 4:
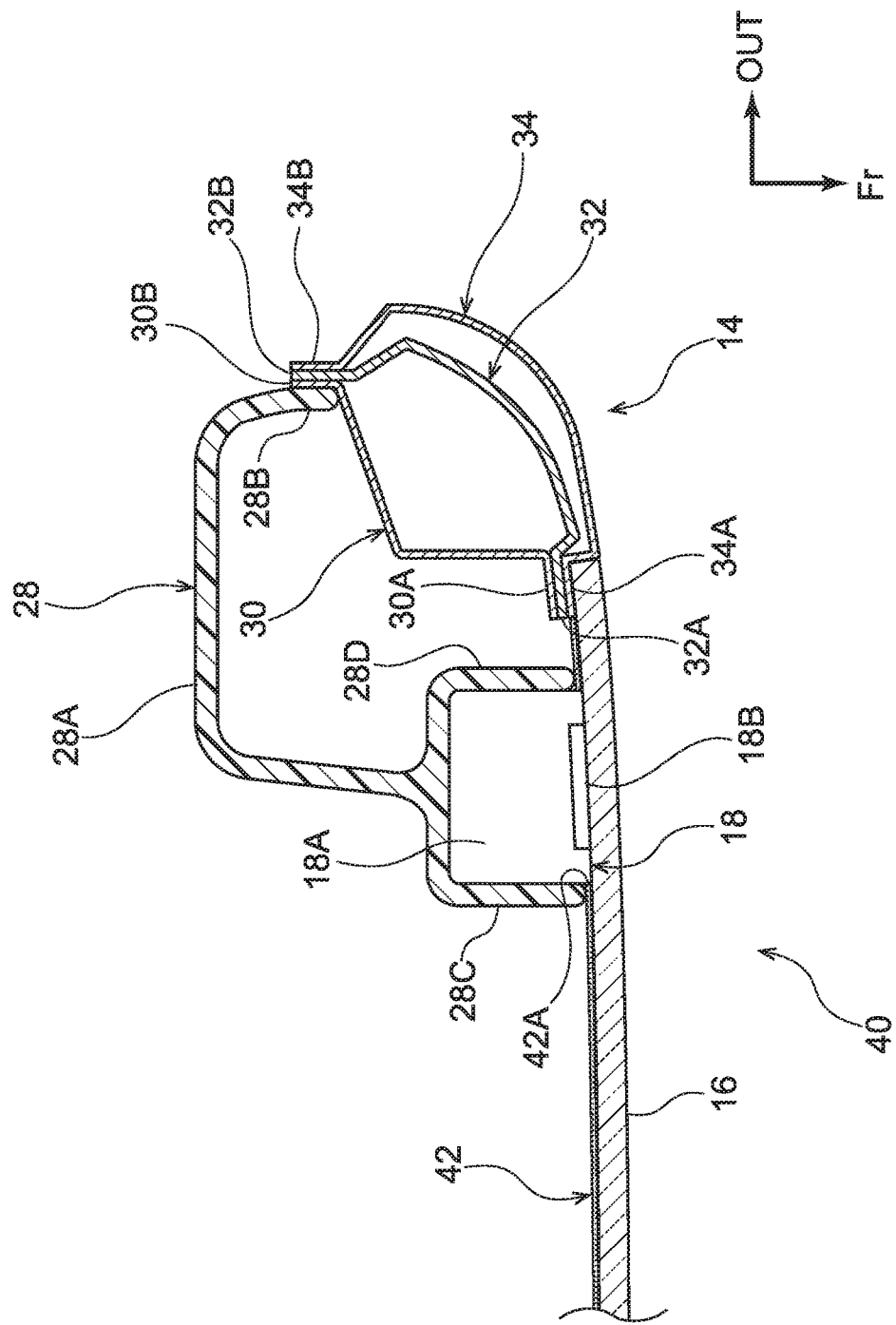
FIG. 4 is a sectional diagram showing a section cut along line 4-4 of FIG. 3 in a magnified state.

As shown in FIG. 4, the ceramic treatment portion 42 is coated onto the surface at the vehicle cabin interior side of the front windshield glass 16. An aperture portion 42A is provided in the ceramic treatment portion 42. The ceramic treatment is not applied to the aperture portion 42A. The peripheral information detection sensor 18 is disposed such that the detection portion 18B is positioned at the aperture portion 42A.

In the present variant example, because the ceramic treatment portion 42 is formed around the peripheral information detection sensor 18, the peripheral information detection sensor 18 is less likely to be noticeable. Moreover, because the aperture portion 42A is formed at a region opposing the detection portion 18B, peripheral information of the vehicle 40 may be detected even if the peripheral information detection sensor 18 that is employed is an optical system such as a laser radar, an optical camera or the like.

Even if an inner end portion of the front pillar garnish 28 is joined to the vehicle cabin interior side of the ceramic treatment portion 42, an adhesive or the like that is used for the joining cannot be seen from the vehicle exterior side. Thus, design characteristics of the vehicle 40 may be improved.

In the present variant example, the aperture portion 42A is formed in the ceramic treatment portion 42, but this is not a limitation. For example, the aperture portion 42A need not be formed if the peripheral information detection sensor 18 is structured to detect a medium that passes through the ceramic treatment portion 42, such as a millimeter wave radar or the like. Therefore, if a millimeter wave radar is employed as the peripheral information detection sensor 18, the peripheral information detection sensor 18 may be disposed at the vehicle cabin interior side of this ceramic treatment portion 42 without the aperture portion 42A being formed.

Second Exemplary Embodiment

Now, an self-driving vehicle in which an arrangement structure for a peripheral information detection sensor in accordance with a second exemplary embodiment of the present invention is employed is described with reference to FIG. 5 and FIG. 6. Structures that are the same as in the first exemplary embodiment are assigned the same reference numerals and are not described here.

Figure 5:
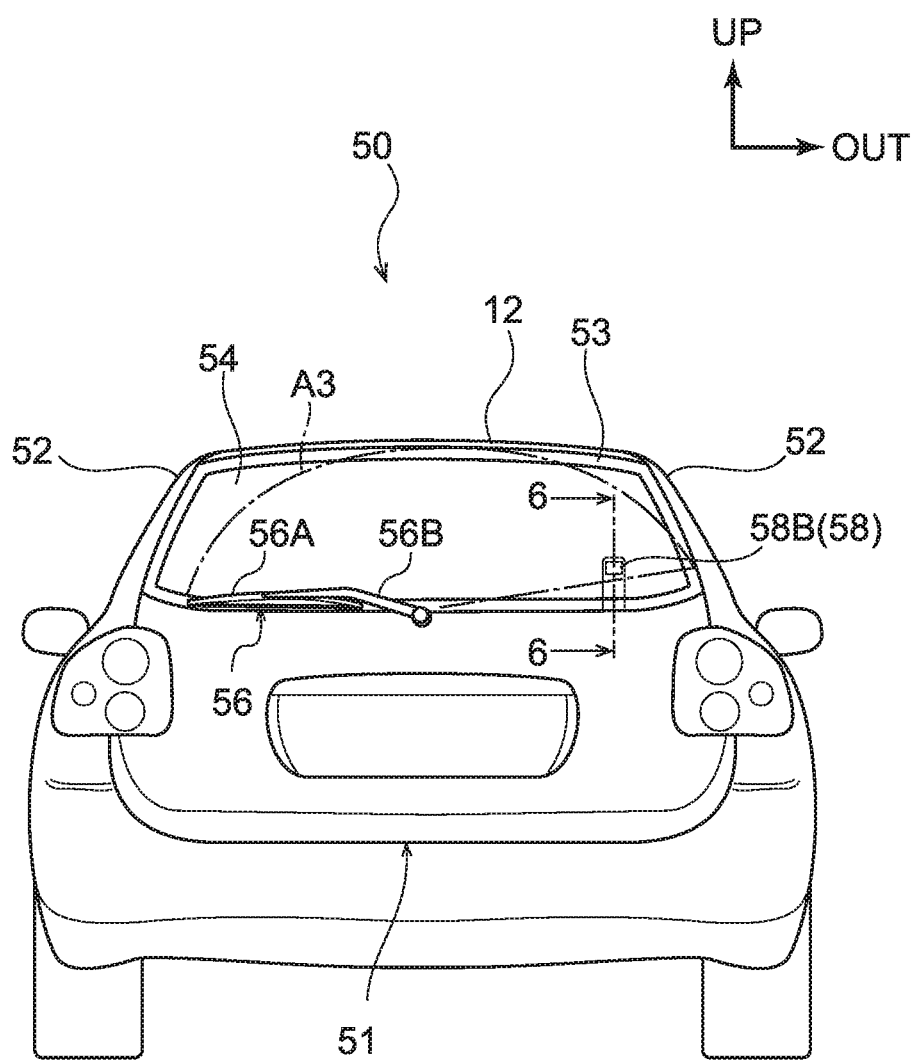
FIG. 5 is a rear view, seen from the vehicle rear side, of a vehicle in which an arrangement structure for a peripheral information detection sensor in accordance with a second exemplary embodiment is employed.

As shown in FIG. 5, a pair of left and right rear pillars 52 are disposed at a vehicle rear portion of a vehicle 50 according to the present exemplary embodiment. The rear pillars 52 respectively extend in the vehicle up-and-down direction. A rear windshield glass (a rear glass) 54 is disposed between the pair of rear pillars 52. The rear windshield glass 54 divides the vehicle cabin interior side from the vehicle cabin exterior side. A ceramic treatment portion 53 is formed in a strip shape at an outer periphery portion of the rear windshield glass 54.

The rear windshield glass 54 is disposed in an upper portion of a back door 51. A rear wiper 56 is provided at the back door 51. The rear wiper 56 includes a wiper blade 56A and a wiper arm 56B. The wiper blade 56A touches against the exterior surface of the rear windshield glass 54 and wipes off rainwater and the like. The wiper arm 56B retains the wiper blade 56A.

The wiper arm 56B and wiper blade 56A are controlled to reciprocate by a motor and a link mechanism, which are not shown in the drawings. The wiper arm 56B and wiper blade 56A are structured so as to wipe a wiping range A3 of the rear windshield glass 54. The rear wiper 56 according to the present exemplary embodiment employs a single-wiper system that wipes with a single wiper. However, the present invention is not limited thus and alternative wiping patterns may be employed.

Figure 6:
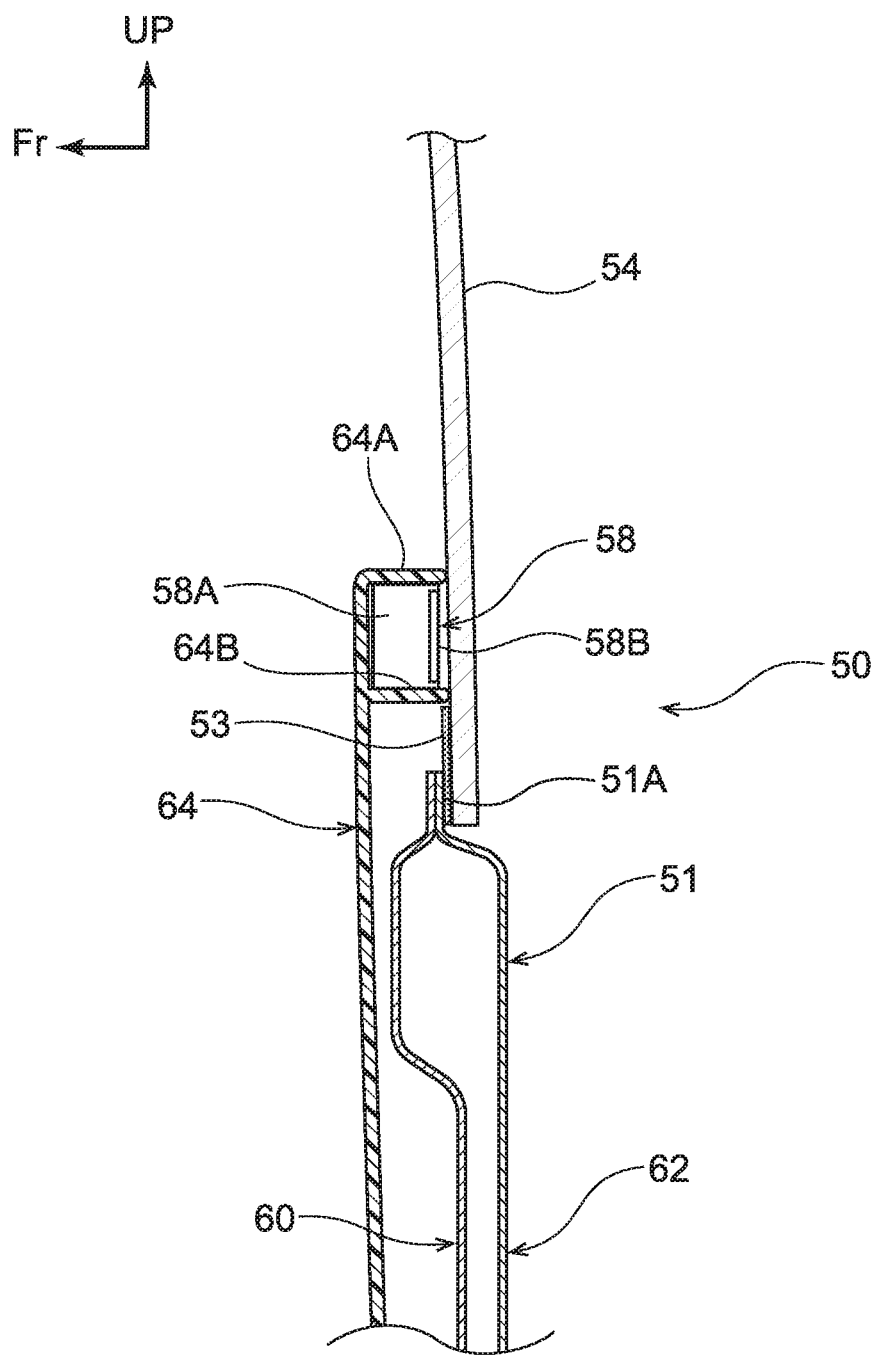
FIG. 6 is a sectional diagram showing a section cut along line 6-6 of FIG. 5 in a magnified state.

As shown in FIG. 6, the back door 51 is formed with a closed cross section structure that is provided with a door inner panel 60 and a door outer panel 62. An upper end portion of the door inner panel 60 and an upper end portion of the door outer panel 62 are joined together by welding or the like at an upper flange portion 51A. The rear windshield glass 54 is joined by an adhesive, which is not shown in the drawings, to a surface at the vehicle rear side of the upper flange portion 51A. A peripheral information detection sensor 58 is disposed at the vehicle cabin interior side of a lower portion of the rear windshield glass 54.

The peripheral information detection sensor 58 is equipped with a main body portion 58A that is formed substantially in a rectangular cuboid shape. A detection portion 58B that detects peripheral information of the vehicle is provided at the main body portion 58A. The detection portion 58B is oriented to the vehicle exterior side of the peripheral information detection sensor 58. The detection portion 58B is disposed at a position that opposes the wiping range A3 of the rear wiper 56 (see FIG. 5).

A back door trim 64 serves as the interior trim member that is disposed at the vehicle cabin interior side of the back door 51. The peripheral information detection sensor 58 is assembled to and made integral with a back door trim 64. The back door trim 64 is formed of a resin material with electrical conductivity. The back door trim 64 is formed by a plate member that extends in the vehicle up-and-down direction as viewed in the vehicle width direction.

An upper portion support piece 64A and a lower portion support piece 64B project toward the rear windshield glass 54 from an upper end portion of the back door trim 64. The main body portion 58A of the peripheral information detection sensor 58 is sandwiched in the up-and-down direction by the upper portion support piece 64A and the lower portion support piece 64B. Bolt holes, which are not shown in the drawings, are formed in the upper portion support piece 64A and the lower portion support piece 64B. Bolts are screwed into these bolt holes and fasten the back door trim 64 and the peripheral information detection sensor 58 together. Thus, the peripheral information detection sensor 58 is covered from the vehicle cabin interior side thereof by the back door trim 64.

Operation and Effects

Now, operations and effects of the vehicle 50 in which the arrangement structure for the peripheral information detection sensor 58 according to the present exemplary embodiment is employed are described. In the present exemplary embodiment, the detection portion 58B of the peripheral information detection sensor 58 is disposed at a position of the rear windshield glass 54 that opposes the wiping range A3 of the rear wiper 56. Therefore, even if rainwater, dirt or the like adheres to the exterior surface of the rear windshield glass 54 during rainy weather or the like, the detection accuracy of the peripheral information detection sensor 58 may be assured by the rear wiper 56 wiping the exterior surface of the rear windshield glass 54.

Because the peripheral information detection sensor 58 is covered from the vehicle cabin interior side thereof by the back door trim 64, the peripheral information detection sensor 58 is not exposed to the vehicle cabin interior side and the peripheral information detection sensor 58 cannot be seen by vehicle occupants. Consequently, the appearance of the vehicle cabin interior side may be improved compared to a structure in which the peripheral information detection sensor 58 is disposed at a position at which the peripheral information detection sensor 58 can be seen.

In the present exemplary embodiment, because the detection portion 58B is oriented to the vehicle rear side, peripheral information at the vehicle rear side may be detected effectively. Other operations are the same as in the first exemplary embodiment.

In the present exemplary embodiment, space is provided between the detection portion 58B of the peripheral information detection sensor 58 and the rear windshield glass 54, but this is not a limitation. A detection surface of the detection portion 58B may be caused to abut against the rear windshield glass 54. In this case, the ingression of foreign matter such as dust or the like between the detection portion 58B and the rear windshield glass 54 may be avoided by the detection surface being caused to make surface contact with a curved surface of the rear windshield glass 54. As a result, the detection accuracy of the peripheral information detection sensor 58 may be excellently maintained.

In the present exemplary embodiment, the peripheral information detection sensor 58 is assembled only to the back door trim 64, but the present invention is not limited thus. For example, as in a variant example illustrated in FIG. 7, the peripheral information detection sensor 58 may be assembled to the back door 51 via a bracket 74.

Figure 7:
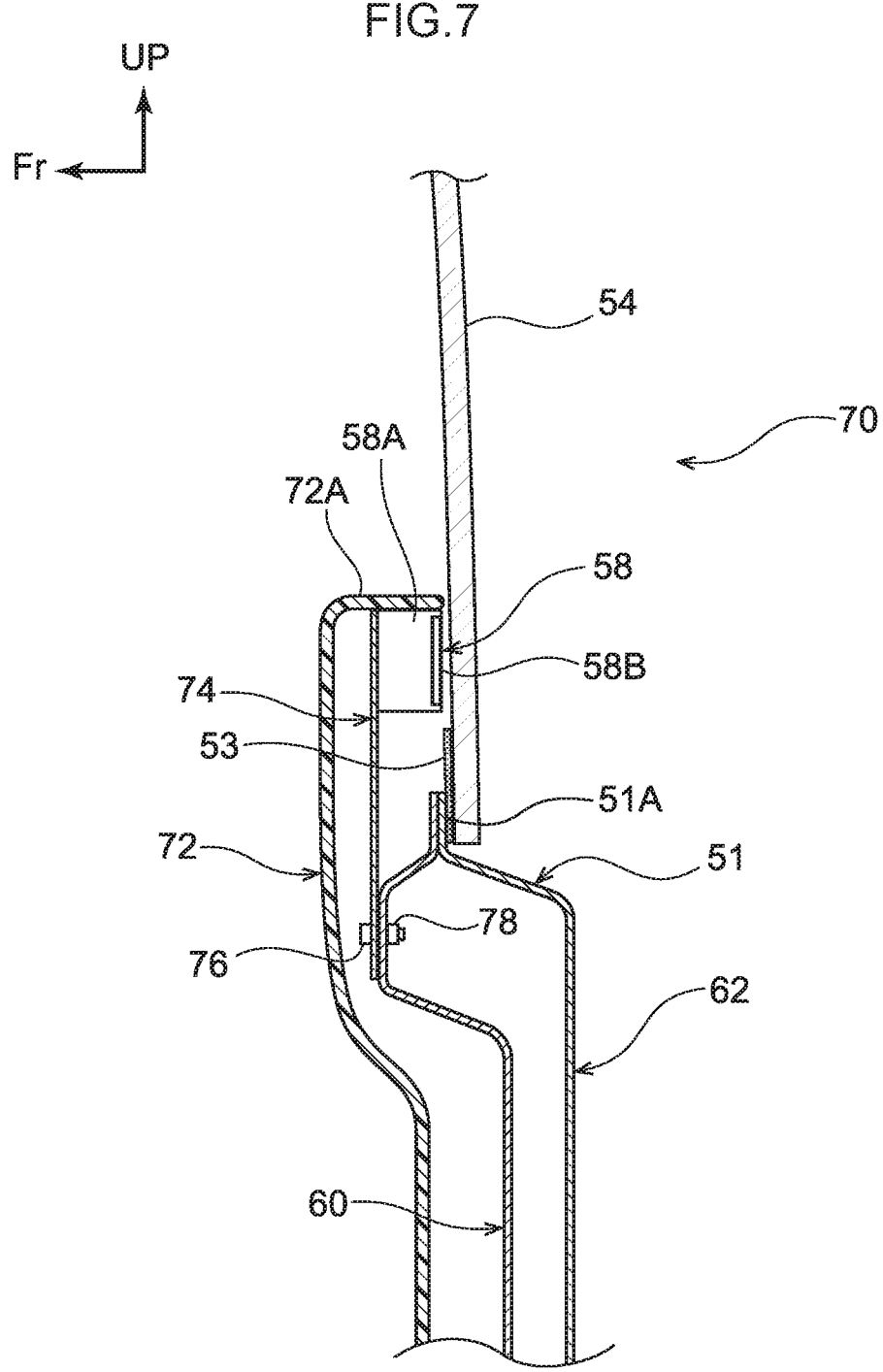
FIG. 7 is a sectional diagram, corresponding to FIG. 6, showing a variant example of the arrangement structure for a peripheral information detection sensor in accordance with the second exemplary embodiment.

As shown in FIG. 7, in the present variant example, the peripheral information detection sensor 58 is covered from the vehicle cabin interior side thereof by a back door trim 72 that serves as the interior trim member. The back door trim 72 is formed by a plate member that extends in the vehicle up-and-down direction as viewed in the vehicle width direction. An upper end portion 72A of the back door trim 72 is inflected to the vehicle rear side toward the rear windshield glass 54. The peripheral information detection sensor 58 is fixed to a lower face of this inflection portion by bolts, which are not shown in the drawing, or the like.

The bracket 74 is joined to a face at the vehicle front side of the peripheral information detection sensor 58. The bracket 74 is formed by a plate member that extends in the vehicle up-and-down direction along the back door trim 72. An upper end portion of the bracket 74 is fastened to the upper end portion 72A of the back door trim 72. A lower end portion of the bracket 74 is fastened to the door inner panel 60 of the back door 51 by a bolt 76 and nut 78. Thus, the peripheral information detection sensor 58 according to the present variant example is joined to the back door trim 72 and the back door 51.

In the present variant example, assembly stiffness is improved by the peripheral information detection sensor 58 being assembled to the back door 51 that has the closed cross section structure. Therefore, a reduction in detection accuracy of the peripheral information detection sensor 58 due to vibrations during running and the like may be suppressed. In the present variant example, space is provided between the detection portion 58B of the peripheral information detection sensor 58 and the rear windshield glass 54, but this is not a limitation. The detection surface of the detection portion 58B may be abutted against the rear windshield glass 54.

Third Exemplary Embodiment

Now, an self-driving vehicle in which an arrangement structure for a peripheral information detection sensor in accordance with a third exemplary embodiment of the present invention is employed is described with reference to FIG. 8 and FIG. 9. Structures that are the same as in the first exemplary embodiment and the second exemplary embodiment are assigned the same reference numerals and are not described here.

Figure 8:
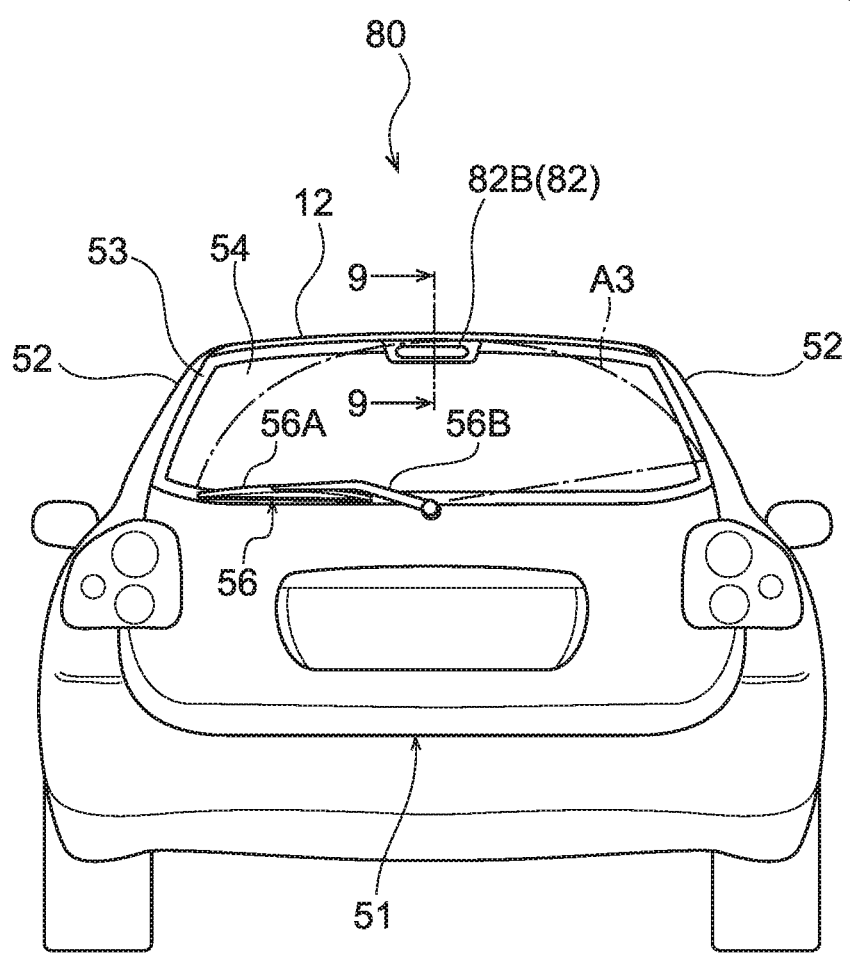
FIG. 8 is a rear view, seen from the vehicle rear side, of a vehicle in which an arrangement structure for a peripheral information detection sensor in accordance with a third exemplary embodiment is employed.

As shown in FIG. 8, in the present exemplary embodiment, a peripheral information detection sensor 82 is disposed at the vehicle cabin interior side of an upper portion of the rear windshield glass 54, which structures an self-driving vehicle 80 (hereinafter referred to simply as "the vehicle 80").

Figure 9:
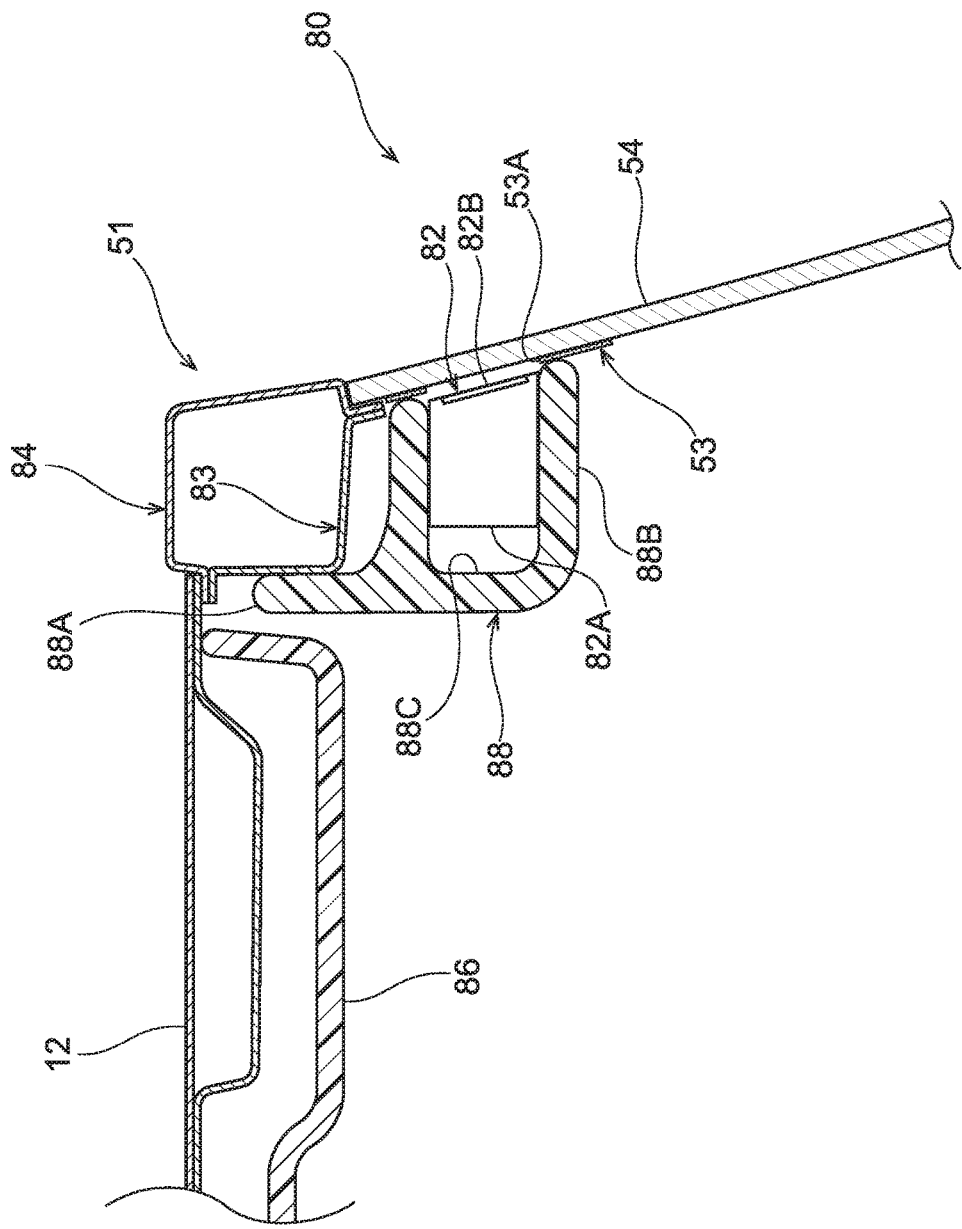
FIG. 9 is a sectional diagram showing a section cut along line 9-9 of FIG. 8 in a magnified state.

As shown in FIG. 9, the peripheral information detection sensor 82 is equipped with a main body portion 82A that is formed substantially in a rectangular cuboid shape. A detection portion 82B that detects peripheral information of the vehicle is provided at the main body portion 82A. The detection portion 82B is oriented to the vehicle exterior side of the peripheral information detection sensor 82. The detection portion 82B is disposed at a position that opposes the wiping range A3 of the rear wiper 56 (see FIG. 8).

A back pillar garnish 88 that serves as the interior trim member is disposed at the vehicle cabin interior side of an upper end portion of the back door 51. The peripheral information detection sensor 82 is assembled to and made integral with the back pillar garnish 88. More specifically, the upper end portion of the back door 51 is formed with a closed cross section structure by a door inner panel 83 and a door outer panel 84 that extend in the vehicle width direction. The upper end portion of the back door 51 is structured to be swingable relative to the vehicle main body by means of a door hinge, which is not shown in the drawings. A roof head lining 86 is provided at the vehicle lower side of the roof panel 12.

The back pillar garnish 88 is fixed to the door inner panel 83 that structures the back door 51 by clips, which are not shown in the drawings, or the like. An upper end portion 88A of the back pillar garnish 88 abuts against the door inner panel 83, and a mounting portion 88B of the back pillar garnish 88 projects toward the vehicle rear side from a lower end portion of the back pillar garnish 88. A recess portion 88C that opens to the vehicle rear side is formed in the mounting portion 88B. The peripheral information detection sensor 82 is inserted into the recess portion 88C. The peripheral information detection sensor 82 is fastened to the back pillar garnish 88 by bolts, which are not shown in the drawing, or the like. Thus, the peripheral information detection sensor 82 is covered from the vehicle cabin interior side thereof by the back pillar garnish 88.

In the present exemplary embodiment, the ceramic treatment portion 53 is formed in the strip shape at the outer periphery portion of the rear windshield glass 54. An aperture portion 53A is provided in the ceramic treatment portion 53, and the detection portion 82B is disposed at a position opposing the aperture portion 53A.

Operation and Effects

Now, operations and effects of the vehicle 80 in which the arrangement structure for the peripheral information detection sensor 82 according to the present exemplary embodiment is employed are described. In the present exemplary embodiment, because the peripheral information detection sensor 82 is disposed at the vehicle cabin interior side of the upper portion of the rear windshield glass 54, peripheral information of the vehicle 80 may be detected over a wider range compared to a structure in which the peripheral information detection sensor 82 is disposed at a lower portion of the rear windshield glass 54. Other operations are the same as in the first exemplary embodiment and the second exemplary embodiment.

In the present exemplary embodiment, space is provided between the detection portion 82B of the peripheral information detection sensor 82 and the rear windshield glass 54, but this is not a limitation. A detection surface of the detection portion 82B may be abutted against the rear windshield glass 54.

Fourth Exemplary Embodiment

Now, an self-driving vehicle in which an arrangement structure for a peripheral information detection sensor according to a fourth exemplary embodiment of the present invention is employed is described with reference to FIG. 10 and FIG. 11.

Figure 10:
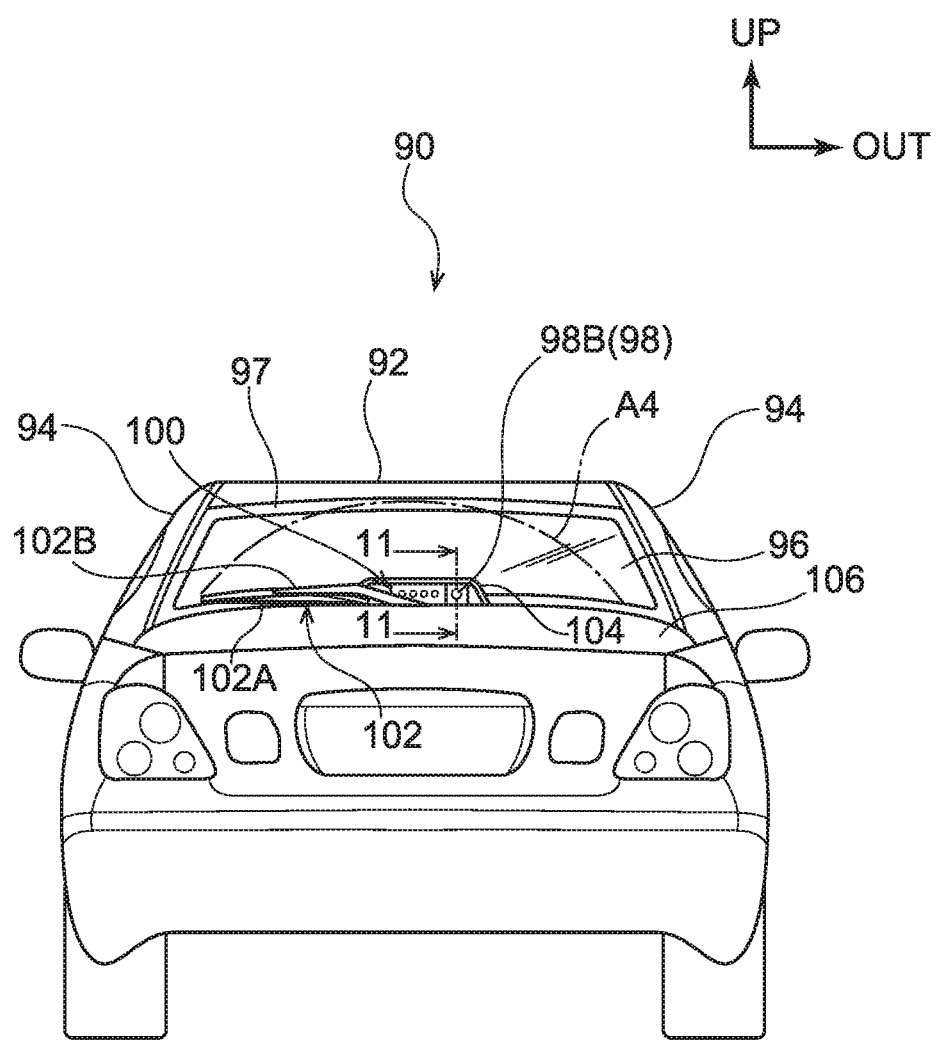
FIG. 10 is a rear view, seen from the vehicle rear side, of a vehicle in which an arrangement structure for a peripheral information detection sensor in accordance with a fourth exemplary embodiment is employed.

As shown in FIG. 10, the arrangement structure for the peripheral information detection sensor according to the present exemplary embodiment is employed in a sedan-type self-driving vehicle 90 (hereinafter referred to simply as "the vehicle 90").

A roof panel 92 is disposed at an upper portion of the vehicle 90. A pair of left and right roof side rails, which are not shown in the drawings, are disposed at the two vehicle width direction sides of the roof panel 92. A pair of left and right rear pillars 94 extend toward the vehicle lower side from rear end portions of the roof side rails. A rear windshield glass (a rear glass) 96 is disposed between the rear pillars 94. The rear windshield glass 96 divides the vehicle cabin interior side from the vehicle cabin exterior side. A ceramic treatment portion 97 is formed in a strip shape at an outer periphery portion of the rear windshield glass 96.

A luggage hood 106 openably closes a luggage compartment. A lower end portion of the rear windshield glass 96 opposes the luggage hood 106 in the vehicle front-and-rear direction (see FIG. 11). A rear wiper 102 is disposed between the lower end portion of the rear windshield glass 96 and the luggage hood 106.

The rear wiper 102 includes a wiper blade 102A and a wiper arm 102B. The wiper blade 102A touches against the exterior surface of the rear windshield glass 96 and wipes off rainwater and the like. The wiper arm 102B retains the wiper blade 102A. The wiper arm 102B and wiper blade 102A are controlled to reciprocate by a motor and a link mechanism, which are not shown in the drawings. The wiper arm 102B and wiper blade 102A are structured so as to wipe a wiping range A4 of the rear windshield glass 96.

A high mount stop lamp 100 is disposed at the vehicle cabin interior side of a lower end portion of the rear windshield glass 96. The high mount stop lamp 100 is disposed at a vehicle width direction central portion and is assembled to a trim cover 104 that serves as the interior trim member. A peripheral information detection sensor 98 is disposed to the vehicle right side of the high mount stop lamp 100 as viewed from the vehicle rear.

As shown in FIG. 11, the trim cover 104 is disposed at an upper face of a package tray trim 108. The trim cover 104 is formed by a member with electrical conductivity. The trim cover 104 is formed substantially in a box shape of which a region that opposes the rear windshield glass 96 is open. The peripheral information detection sensor 98 is assembled to the inside of the trim cover 104. Therefore, the peripheral information detection sensor 98 is covered from the vehicle cabin interior side thereof by the trim cover 104.

The peripheral information detection sensor 98 is equipped with a main body portion 98A. A detection portion 98B that detects peripheral information of the vehicle 90 is provided at the main body portion 98A. This detection portion 98B is disposed at a position that opposes the wiping range A4 of the rear wiper 102 (see FIG. 10).

Operation and Effects

Now, operations and effects of the vehicle 90 in which the arrangement structure for the peripheral information detection sensor 98 according to the present exemplary embodiment is employed are described. In the present exemplary embodiment, the detection portion 98B of the peripheral information detection sensor 98 is disposed at a position that opposes the wiping range A4 of the rear wiper 102 on the rear windshield glass 96. Therefore, even if rainwater, dirt or the like adheres to the exterior surface of the rear windshield glass 96 during rainy weather or the like, the detection accuracy of the peripheral information detection sensor 98 may be assured by the rear wiper 102 wiping the exterior surface of the rear windshield glass 96.

Because the peripheral information detection sensor 98 is covered from the vehicle cabin interior side thereof by the trim cover 104, the peripheral information detection sensor 98 is not exposed to the vehicle cabin interior side and the peripheral information detection sensor 98 cannot be seen by vehicle occupants. Consequently, the appearance of the vehicle cabin interior side may be improved compared to a structure in which the peripheral information detection sensor 98 is disposed at a position at which the peripheral information detection sensor 98 can be seen.

In the present exemplary embodiment, the peripheral information detection sensor 98 is assembled to the trim cover 104 and is disposed at a location adjacent to the high mount stop lamp 100. Therefore, a wire harness for the peripheral information detection sensor 98 may be disposed together with wiring for the high mount stop lamp 100 and the like. As a result, work for assembly of the peripheral information detection sensor 98, arrangement of the wire harness and the like does not take time and effort.

In the present exemplary embodiment, space is provided between the detection portion 98B of the peripheral information detection sensor 98 and the rear windshield glass 96, but this is not a limitation. A detection surface of the detection portion 98B may be caused to abut against the rear windshield glass 96.

In the present exemplary embodiment, the peripheral information detection sensor 98 is disposed at the vehicle right side of the high mount stop lamp 100 but the present invention is not limited thus. For example, the peripheral information detection sensor 98 may be disposed at the vehicle left side of the high mount stop lamp 100. Further, the peripheral information detection sensor 98 may be disposed at both the vehicle right side and the vehicle left side of the high mount stop lamp 100, in which case peripheral information of the vehicle 90 may be detected using two of the peripheral information detection sensor 98.

The first to fourth exemplary embodiments of the present invention have been described hereabove but the present invention is not limited by the structures described above and it will be clear that the present invention may be embodied in numerous modes beside the above structures within a scope that does not depart from the gist of the present invention. For example, the first exemplary embodiment and the second exemplary embodiment may be combined to form a structure in which the peripheral information detection sensor 18 is disposed at the vehicle cabin interior side of the front windshield glass 16 and the peripheral information detection sensor 58 is disposed at the vehicle cabin interior side of the rear windshield glass 54.

In the exemplary embodiments described above, the interior trim members are formed by members that feature electrical conductivity, but the present invention is not limited thus. For example, a structure is possible in which the interior trim member is formed by a non-conductive member and a conductive sheet or the like is adhered to a surface of the interior trim member. This structure similarly provides an effect of blocking electromagnetic waves that are directed toward the peripheral information detection sensor.

The shapes and sizes of the peripheral information detection sensors and the positions and shapes of the detection portions according to the above exemplary embodiments are not particularly limiting but may be suitably modified in accordance with types, positions of arrangement and the like of peripheral information detection sensors.

What is claimed is:

1. An arrangement structure for a peripheral information detection sensor, the arrangement structure comprising:
    an interior trim member of a vehicle, the interior trim member being configured to: cover, from a vehicle cabin interior side, both a body panel structuring a vehicle body of the vehicle, and the peripheral information detection sensor disposed at a position such that a detection portion of the peripheral information detection sensor can detect peripheral information of the vehicle through a windshield glass of the vehicle within a wiping range of a wiper disposed on a vehicle cabin exterior side of the windshield glass of the vehicle, and
    the peripheral information detection sensor, wherein
        the peripheral information detection sensor is configured to detect the peripheral information of the vehicle through the windshield glass of the vehicle within the wiping range of the wiper disposed on the vehicle cabin exterior side of the windshield glass of the vehicle,
        the body panel structuring the vehicle body is different from the windshield glass,
        the body panel structuring the vehicle body is a pillar of two pillars in which the windshield glass is disposed between, and
        the interior trim member is a front or rear pillar garnish.

2. The arrangement structure according to claim 1, wherein the peripheral information detection sensor is assembled to the interior trim member and made integral with the interior trim member.

3. The arrangement structure according to claim 1, wherein a detection surface of the detection portion abuts against a surface of the windshield glass at the vehicle cabin interior side.

4. The arrangement structure according to claim 1, wherein the interior trim member is formed by a material having electrical conductivity such that electromagnetic waves generated at the vehicle cabin interior side that are directed toward the peripheral information detection sensor are blocked.

5. The arrangement structure according to claim 1, wherein the peripheral information detection sensor is disposed closer to a leftmost side of the vehicle or a rightmost side of the vehicle than to the center of the vehicle.

6. A self-driving vehicle comprising:
    an arrangement structure for a peripheral information detection sensor, the arrangement structure comprising:
        an interior trim member of a vehicle, the interior trim member being configured to: cover, from a vehicle cabin interior side, both a body panel structuring a vehicle body of the vehicle, and the peripheral information detection sensor disposed at a position such that a detection portion of the peripheral information detection sensor can detect peripheral information of the vehicle through a windshield glass of the vehicle within a wiping range of a wiper disposed on a vehicle cabin exterior side of the windshield glass of the vehicle,
        the peripheral information detection sensor, and
    a control unit that controls running of the vehicle in accordance with peripheral information detected by the peripheral information detection sensor, wherein
        the peripheral information detection sensor is configured to detect the peripheral information of the vehicle through the windshield glass of the vehicle within the wiping range of the wiper disposed on the vehicle cabin exterior side of the windshield glass of the vehicle,
        the body panel structuring the vehicle body is different from the windshield glass,
        the body panel structuring the vehicle body is a pillar of two pillars in which the windshield glass is disposed between, and
        the interior trim member is a front or rear pillar garnish.

7. An arrangement structure for a peripheral information detection sensor, the arrangement structure comprising:
    an interior trim member of a vehicle, the interior trim member including a portion formed to cover a body panel structuring a vehicle body from the vehicle cabin interior side, and a portion formed to cover, from the vehicle cabin interior side, the peripheral information detection sensor disposed at a position such that a detection portion of the peripheral information detection sensor can detect peripheral information of the vehicle through a windshield glass of the vehicle within a wiping range of a wiper disposed on a vehicle cabin exterior side of the windshield glass of the vehicle; and
    the peripheral information detection sensor, wherein
        the peripheral information detection sensor is configured to detect the peripheral information of the vehicle through the windshield glass of the vehicle within the wiping range of the wiper disposed on the vehicle cabin exterior side of the windshield glass of the vehicle,
        the body panel structuring the vehicle body is different from the windshield glass, the body panel structuring the vehicle body is a pillar of two pillars in which the windshield glass is disposed between, and the interior trim member is a front or rear pillar garnish.

* * * * *